US005580175A

United States Patent [19]
Polch et al.

[11] Patent Number: 5,580,175
[45] Date of Patent: Dec. 3, 1996

[54] BEARING WITH PARTICLE TRAP

[75] Inventors: Ewaryst Z. Polch, Monument; Carl D. Williams, Colorado Springs, both of Colo.

[73] Assignee: Quantum Corporation, Milpitas, Calif.

[21] Appl. No.: 525,298

[22] Filed: Sep. 7, 1995

[51] Int. Cl.$^6$ ............................................. F16C 32/06
[52] U.S. Cl. ................................. 384/113; 384/107
[58] Field of Search ............................ 384/100, 107, 384/108–113, 114, 118, 286, 291, 397

[56] References Cited

U.S. PATENT DOCUMENTS

| | | | |
|---|---|---|---|
| 4,254,961 | 3/1981 | Fersht et al. | 384/100 X |
| 4,596,474 | 6/1986 | Van Roemburg | 384/114 |
| 4,673,997 | 6/1987 | Gowda et al. | 360/107 |
| 4,726,693 | 2/1988 | Anderson et al. | 384/114 |
| 4,772,136 | 9/1988 | Carter | 384/112 |
| 4,795,275 | 1/1989 | Titcomb et al. | 384/107 |
| 4,892,418 | 1/1990 | Asada et al. | 384/124 |
| 4,938,611 | 7/1990 | Nii et al. | 384/107 X |
| 5,067,528 | 11/1991 | Titcomb et al. | 141/4 |
| 5,112,142 | 5/1992 | Titcomb et al. | 384/107 |
| 5,246,294 | 9/1993 | Pan | 384/119 |
| 5,358,339 | 10/1994 | Konno et al. | 384/113 X |

*Primary Examiner*—Thomas R. Hannon
*Attorney, Agent, or Firm*—David B. Harrison; Ralph F. Crandell

[57] ABSTRACT

A hydrodynamic bearing journaling a shaft includes a rotatable bushing journaling the shaft and thrust plates on the shaft at opposite ends of the bushing. The bushing is encased in a cylindrical sleeve. Lubricant containing clearance spaces are formed between the shaft, bushing, sleeve, and thrust plates. An internal radial chamber in the sleeve between the bushing and sleeve stores lubricant and collects foreign particles. Radial ports through the bushing provide for flow of lubricant between the journal bearing and the shaft and thrust plates.

5 Claims, 3 Drawing Sheets

5,580,175

BEARING WITH PARTICLE TRAP

BACKGROUND OF THE INVENTION

1. Field of the Invention

The present invention relates to precision journal bearings for high speed precision drive shafts. More particularly, the present invention relates to high speed, internally lubricated, hydrodynamic journal or spindle bearings finding particular but not necessarily exclusive utility for magnetic media drive mechanisms.

2. Description of the Prior Art

Bearings of the character embodying the present invention are disclosed in U.S. Pat. No. 4,795,275, issued Jan. 3, 1989, to F. Titcomb and J. Cordova, for "Hydrodynamic Bearing." Such bearings are also disclosed in U.S. Pat. No. 4,596,474, issued Jun. 24, 1986, to F. Van Roemburg; U.S. Pat. No. 4,726,693, issued Feb. 23, 1988, to J. Anderson and R. Sleger; U.S. Pat. No. 5,067,528, issued Nov. 26, 1991, to F. Titcomb and J. Cordova; and U.S. Pat. No. 5,112,142, issued May 12, 1992, to F. Titcomb and J. Cordova. Such hydrodynamic bearings include a bearing sleeve with an internal journal bushing press fitted therein and in which is journaled a precision shaft, with provision between the shaft and bushing for incorporating lubricants. Thrust bearings are mounted on the shaft on opposite sides of the bushing. Flats are conventionally machined on the exterior surface of the bushing before press or shrink fit assembly into the sleeve to provide axially extending pressure equalizing lubricant passages in the bearing, with ports or passages through the bushing for conducting lubricant to the shaft journaled in the bushing and to the thrust bearings.

OBJECTS OF THE INVENTION

It is the principal object of the present invention to provide an improved hydrodynamic bearing.

More specifically, it is an object of the present invention to provide an improved hydrodynamic bearing having a trap for collecting foreign particles from the lubricant.

It is another object of the present invention to provide an improved hydrodynamic, internally lubricated shaft and journal sleeve bearing structure having enhanced particle removal characteristics, which is readily constructed and assembled, rugged in use, and suitable for high speed equipment such as magnetic media disk drives.

SUMMARY OF THE INVENTION

Figure 1:
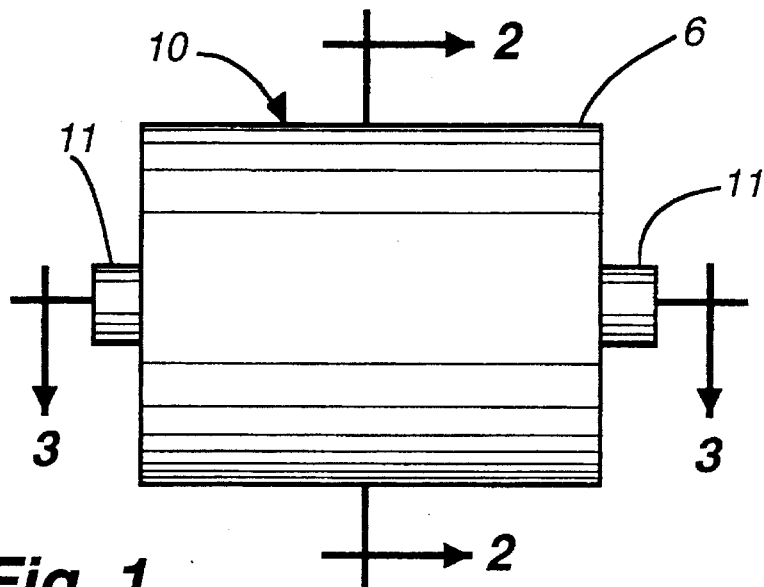
FIG. 1 is an elevation view of a hydrodynamic bearing embodying the present invention.

In accordance with the foregoing objects, the present invention is embodied in a hydrodynamic bearing comprising an outer cylindrical sleeve having a bushing, with a smaller inside diameter, press or shrink fitted therein, and shaft journals rotatably journaled in the bushing. A pair of thrust plates are mounted on the shaft and rotatably and sealingly coact with radially extending faces on the smaller diameter portion of the bushing. The clearance spaces between the bushing, shaft journals and thrust plates, and the axial passages between the bushing and sleeve are filled with a lubricant. The external faces of the thrust plates are exposed to the air. The inner diameter portion of the sleeve includes a circumferential channel which, with radial ports through the bushing, defines a lubricant chamber which contains lubricant and which collects and retains foreign particles from the lubricant and bearing.

DESCRIPTION OF THE PREFERRED EMBODIMENT

The present invention is embodied in an internally lubricated journal bearing 10 incorporating a sleeve and bushing assembly 11 rotatably journaling a shaft 12, with thrust plates 13 supported on opposite ends of the shaft 12 in operative coaction with the sleeve and bushing assembly 11. The shaft 12 defines spaced spools or journals 14. The thrust plates 13 are mounted on the shaft 12 on each shaft spool journal 14. The thrust plates 13 may be press fit onto the shaft journals 14 to provide a lubricant tight seal therebetween.

Figure 2:
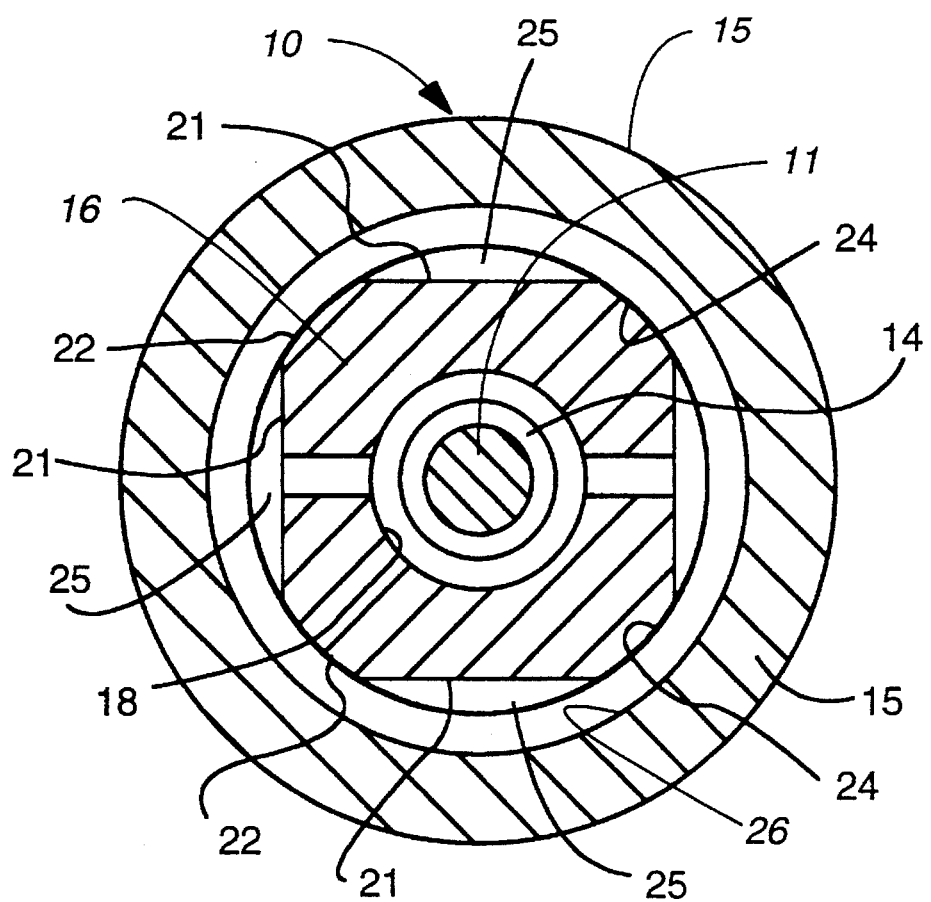
FIG. 2 is a vertical section view taken substantially in the plane of line 2—2 on FIG. 1.
Figure 3:
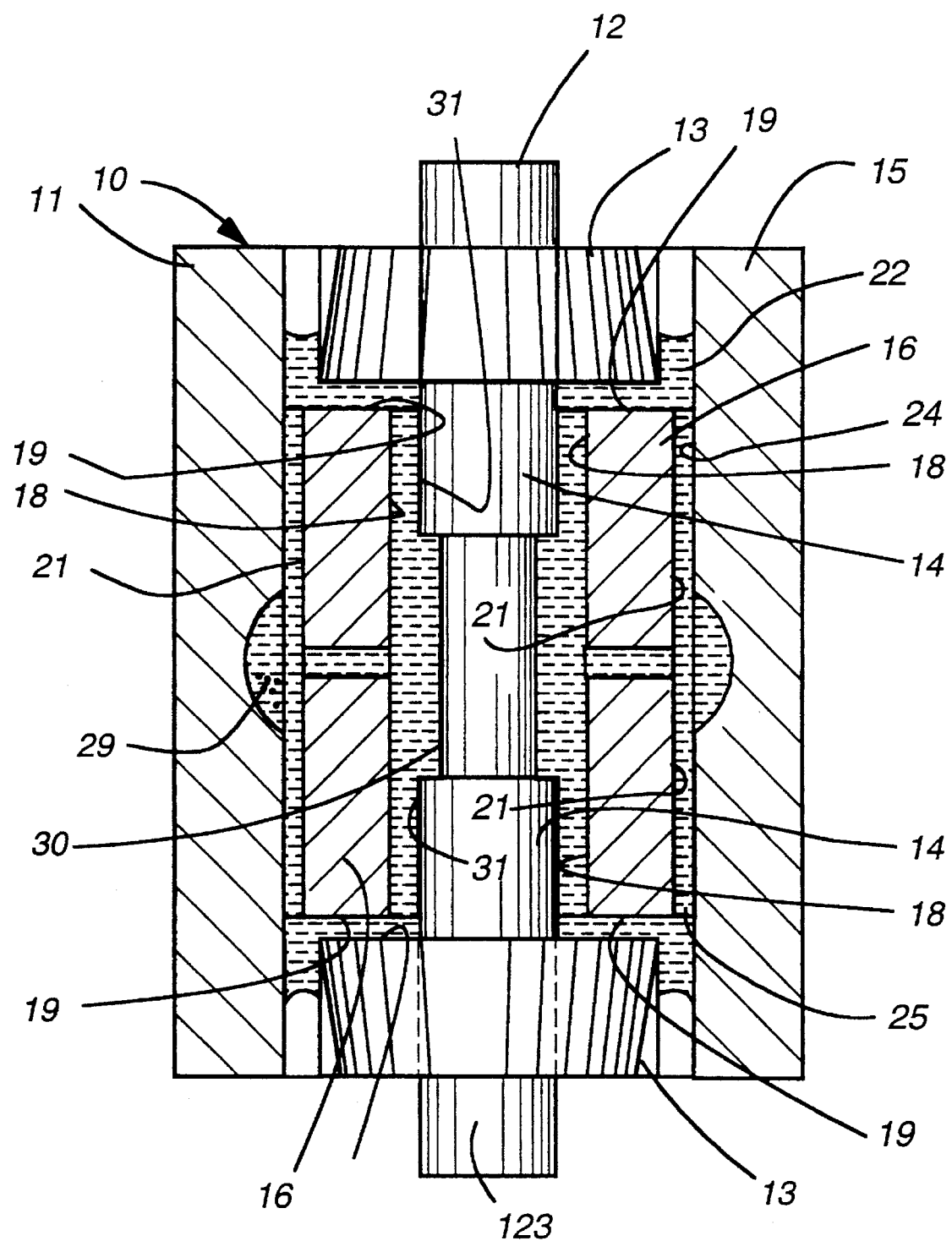
FIG. 3 is a horizontal section view taken substantially in the plane of line 3—3 on FIG. 1.
Figure 4:
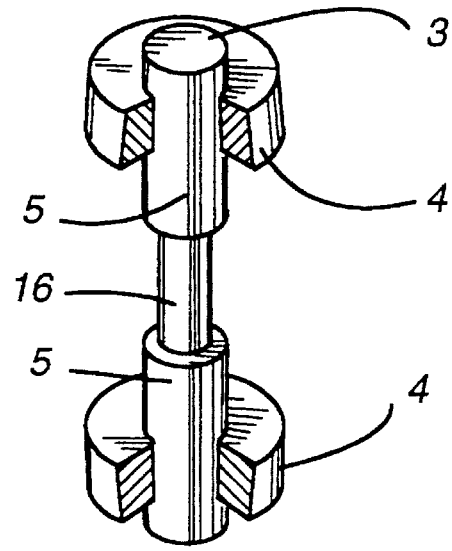
FIG. 4 is a perspective view of a journal bearing embodying the present invention, with parts cut away for clarity.
Figure 5:
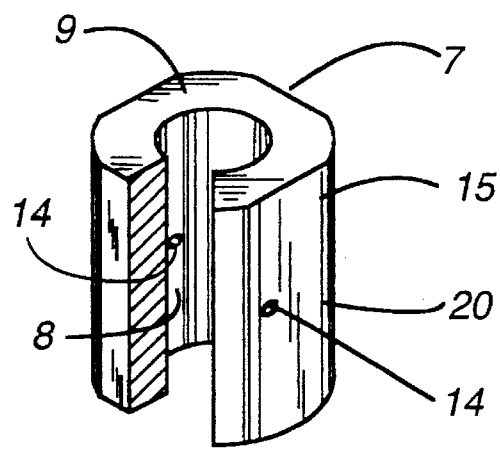
FIG. 5 is a perspective view of a sleeve portion of the bearing shown in FIG. 4, with parts cut away for clarity.

The journal bearing sleeve and bushing assembly 11 is formed by an external sleeve 15 having an internal bushing 16 press or shrink fit mounted therein. The internal bushing 16 defines an inner, axially extending journal bearing surface 18 within which the shaft journals 14 are rotatingly supported or journaled. At its opposite ends, the internal bushing 16 defines radially extending thrust surfaces 19 in opposing relationship with internal radial surfaces 20 on the thrust plates 13. Axially extending flats 21 machined or formed on the external surface 22 of the bushing 16 define, with the inner surface 24 of the sleeve 15, axially extending, lubricant containing, pressure equalization passages 25 (FIGS. 2 and 3).

Figure 6:
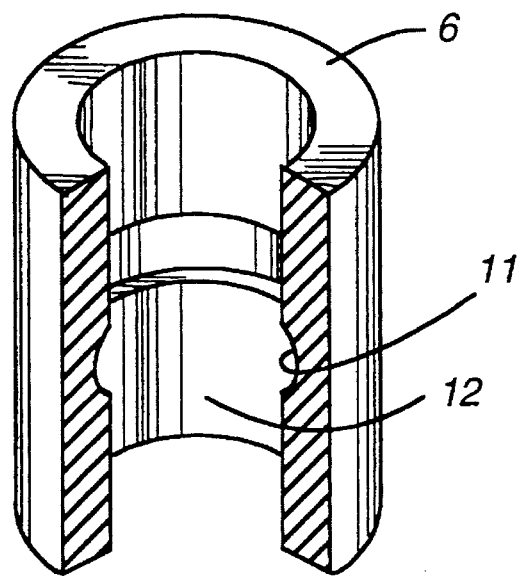
FIG. 6 is a perspective view of a bushing portion of the bearing shown in FIG. 4, with parts cut away for clarity.

For collecting foreign particles 29 in the lubricant, such as tiny metal particles, an internal lubricant reservoir in the form of an internal circumferential channel 26 (FIGS. 2, 3 and 6) is defined in the inner surface 24 of the sleeve 15. A plurality of radial ports 28 extend from the inner surface 18 of the bushing 16 to the outer surface 22 thereof, and open into the lubricant reservoir channel 26 defined in the sleeve 15, thereby providing a lubricant passage from the reservoir channel 26 to the shaft journals 14 and inner bushing surface 18. Because of centrifugal forces on the bearing and lubricant, foreign particles 29 tend to collect and are retained in the internal lubricant reservoir channel 26. The surface of the channel 26 may be rough cut to assist in particle retention.

Lubricant is also contained in a circumferential shaft recess or channel 30 which extends axially between the shaft journals 14. The shaft journals 14 define axially extending circumferential bearing surfaces 31 which operatively coact with the internal surface 18 of the bushing 16 and the lubricant to journal the shaft 12 in the journal bearing bushing 16. Lubricant is contained in the journal bearing structure in a clearance chamber 32 generally formed and defined between the internal surface 18 of the bushing 16 and the external surface 31 of each shaft journal 14, which chamber 32 includes the shaft recess channel 30 and the clearance spaces defined between the facing thrust surfaces 19 and 20 of the bushing 16 and the thrust plates 13, respectively. Lubricant is supplied to the internal chamber 32 thus defined from the reservoir channel 26 defined in the sleeve 15, through the radial ports 28 in the bushing 16, free of harmful particles 29.

While a certain illustrative embodiment of the present invention has been shown in the drawings and described above in considerable detail, it should be understood that there is no intention to limit the invention to the specific modification or embodiment disclosed. On the contrary, the intention is to cover all modifications, alternative constructions, equivalents and uses falling within the spirit and scope of the invention as expressed in the appended claims.

We claim:

1. A hydrodynamic bearing for journaling a shaft, comprising a bushing supported in a sleeve and journaling said shaft, thrust plates on said shaft at opposite ends of said bushing, said bushing, shaft and thrust plates defining a clearance space therebetween for retaining a lubricant, said sleeve and bushing defining a particle collecting lubricant reservoir channel therebetween, and said bushing defining a port between said channel and said clearance space for supplying lubricant free of particles to said clearance space.

2. A bearing as defined in claim 1 further comprising axially extending pressure equalization passages between said sleeve and said bushing.

3. A bearing as defined in claim 2 wherein the surface of said channel is rough to retain foreign particles.

4. A hydrodynamic bearing and shaft assembly comprising a cylindrical bushing encased in a cylindrical sleeve, a shaft journaled in said bushing and including a journal having an outer surface forming a clearance space with respect to the smaller inner surface of said bushing, said clearance space being filled with a lubricant, characterized in that said sleeve defines an inner circumferential channel between said sleeve and said bushing, and said bushing defines radial ports therethrough in communication with said channel and said shaft.

5. A bearing as defined in claim 4 wherein said bearing further comprises pressure equalization passages between said sleeve and said bushing.

* * * * *